(12) United States Patent
Conte

(10) Patent No.: US 8,874,855 B2
(45) Date of Patent: Oct. 28, 2014

(54) DIRECTORY-BASED COHERENCE CACHING

(75) Inventor: Tom Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 1126 days.

(21) Appl. No.: 12/648,092

(22) Filed: Dec. 28, 2009

(65) Prior Publication Data
US 2011/0161596 A1 Jun. 30, 2011

(51) Int. Cl.
*G06F 12/00* (2006.01)
*G06F 12/08* (2006.01)

(52) U.S. Cl.
CPC .................................. *G06F 12/0817* (2013.01)
USPC .................................. 711/141; 711/E12.027

(58) Field of Classification Search
None
See application file for complete search history.

(56) References Cited

U.S. PATENT DOCUMENTS

| | | | | |
|---|---|---|---|---|
| 5,249,283 A * | 9/1993 | Boland | | 711/146 |
| 5,537,575 A * | 7/1996 | Foley et al. | | 711/141 |
| 5,642,494 A * | 6/1997 | Wang et al. | | 711/140 |
| 5,832,534 A * | 11/1998 | Singh et al. | | 711/141 |
| 5,893,155 A * | 4/1999 | Cheriton | | 711/144 |
| 5,903,908 A * | 5/1999 | Singh et al. | | 711/122 |
| 6,044,478 A * | 3/2000 | Green | | 714/42 |
| 6,192,451 B1 * | 2/2001 | Arimilli et al. | | 711/141 |
| 6,263,407 B1 | 7/2001 | Arimilli et al. | | |
| 6,282,615 B1 * | 8/2001 | Arimilli et al. | | 711/122 |
| 6,334,172 B1 * | 12/2001 | Arimilli et al. | | 711/144 |
| 6,341,336 B1 * | 1/2002 | Arimilli et al. | | 711/144 |
| 6,477,620 B1 * | 11/2002 | Bauman et al. | | 711/118 |
| 7,043,610 B2 * | 5/2006 | Horn et al. | | 711/144 |
| 7,380,068 B2 * | 5/2008 | Shafi et al. | | 711/141 |
| 7,484,046 B2 * | 1/2009 | Goodman et al. | | 711/146 |
| 7,552,288 B2 * | 6/2009 | Iyer et al. | | 711/141 |
| 7,571,285 B2 * | 8/2009 | Hughes et al. | | 711/130 |
| 7,600,080 B1 * | 10/2009 | Bhattacharyya et al. | | 711/143 |
| 7,620,526 B2 * | 11/2009 | Back et al. | | 703/1 |
| 7,640,401 B2 * | 12/2009 | Tsien | | 711/141 |
| 7,761,485 B2 * | 7/2010 | Papoutsakis et al. | | 707/812 |
| 2002/0099913 A1 * | 7/2002 | Steely, Jr. | | 711/122 |
| 2003/0097531 A1 * | 5/2003 | Arimilli et al. | | 711/146 |
| 2004/0039880 A1 * | 2/2004 | Pentkovski et al. | | 711/146 |
| 2005/0256839 A1 * | 11/2005 | Leong et al. | | 707/1 |
| 2008/0104085 A1 * | 5/2008 | Papoutsakis et al. | | 707/100 |
| 2008/0307168 A1 * | 12/2008 | Lilly et al. | | 711/146 |
| 2010/0017416 A1 * | 1/2010 | Back et al. | | 707/10 |
| 2010/0023552 A1 * | 1/2010 | Back et al. | | 707/103 R |

OTHER PUBLICATIONS

Jim Handy, "The Cache Memory Book: The Authoritative Reference on Cache Memory", Second Edition, Academic Press, 1998, pp. 12-13, 156-187, and 210-211.*

(Continued)

*Primary Examiner* — Christopher Birkhimer
(74) *Attorney, Agent, or Firm* — Dorsey & Whitney LLP

(57) ABSTRACT

Techniques are generally described for methods, systems, data processing devices and computer readable media related to multi-core parallel processing directory-based cache coherence. Example systems may include one multi-core processor or multiple multi-core processors. An example multi-core processor includes a plurality of processor cores, each of the processor cores having a respective cache. The system may further include a main memory coupled to each multi-core processor. A directory descriptor cache may be associated with the plurality of the processor cores, where the directory descriptor cache may be configured to store a plurality of directory descriptors. Each of the directory descriptors may provide an indication of the cache sharing status of a respective cache-line-sized row of the main memory.

21 Claims, 6 Drawing Sheets

(56) References Cited

OTHER PUBLICATIONS

Webopedia, "Cache Coherency", Apr. 5, 2001, pp. 1-2, http://web.archive.org/web/20010405165326/http://www.webopedia.com/TERM/C/cache_coherence.html.*

Jim Handy, "The Cache Memory Book: The Authoritative Reference on Cache Design", Second Edition, pp. 46-47, 56-57, 72-73, and 204-207.*

Brown, J. A. et al., "Proximity-Aware Directory-based Coherence for Multi-core Processor Architectures", Proceedings of the nineteenth annual ACM symposium on Parallel algorithms and architectures, ACM, pp. 9, 2007.

Marty, M. R., "Cache Coherence Techniques for Multicore Processors", Michael R. Marty, p. 219, 2008.

* cited by examiner

600 Computer Program Product

602 Computer Readable Medium 604 at least one of 606 one or more instructions for configuring the multi-core processor to store a plurality of directory descriptors in the directory descriptor cache 608 one or more instructions to configure processor to access directory descriptor cache to determine from directory descriptor if data is stored in the cache of one of the cores 610 one or more instructions to configure processor to update directory descriptors responsive to one of the cores accessing the cache-line-sized rows of main memory

Figure 7

DIRECTORY-BASED COHERENCE CACHING

BACKGROUND

Unless otherwise indicated herein, the materials described in this section are not prior art to the claims in this application and are not admitted to be prior art by inclusion in this section.

In multi-core microprocessor systems, each silicon die processor may contain multiple processing elements ("cores"). These cores may have the ability to parallel process vast amounts of data, using algorithms that may be diversified per core. Some algorithms require that threads of execution ("threads") execute in parallel on multiple cores in a cooperative manner. In these situations, sharing of data may be essential.

One way to support sharing of data between threads executing on multi-core microprocessors is to supply each core with a respective cache coherent memory mechanism, which may include a cache and a cache controller. Generally, these mechanisms work in hardware to maintain the status of main memory that may be present in one or more of the core's caches.

Two classes of schemes may be utilized to maintain cache coherence, namely bus snoop schemes and coherence directory schemes. In bus snooping cache coherence schemes, the cache controller in each core of the processor monitors an interconnect, couples the processor to a memory to detect writes to and reads from the memory, and then updates the corresponding cache lines accordingly. The bus snooping scheme operates under the assumption that the interconnect is globally-observable by all of the cache controllers. The present disclosure appreciates that such interconnects do not scale well, and may not support multi-core microprocessors with a large number of cores per die, such as in excess of 16 cores per die.

The second cache coherence scheme employs a coherence directory scheme that is maintained either in main memory or in a combination of main memory and the individual caches. Entries ("descriptors") in this coherence directory store the status of respective sets of memory locations, such as cache-line-sized rows of main memory. The status information stored in the descriptors may include, for example, whether a particular cache-line-sized row of main memory is cached in a particular set of caches.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 7 shows an example of a computer readable medium that stores instructions that may be part of a computer program product to configure a multi-core processor; all arranged in accordance with at least some embodiments of the present disclosure.

DETAILED DESCRIPTION

Figure 1:
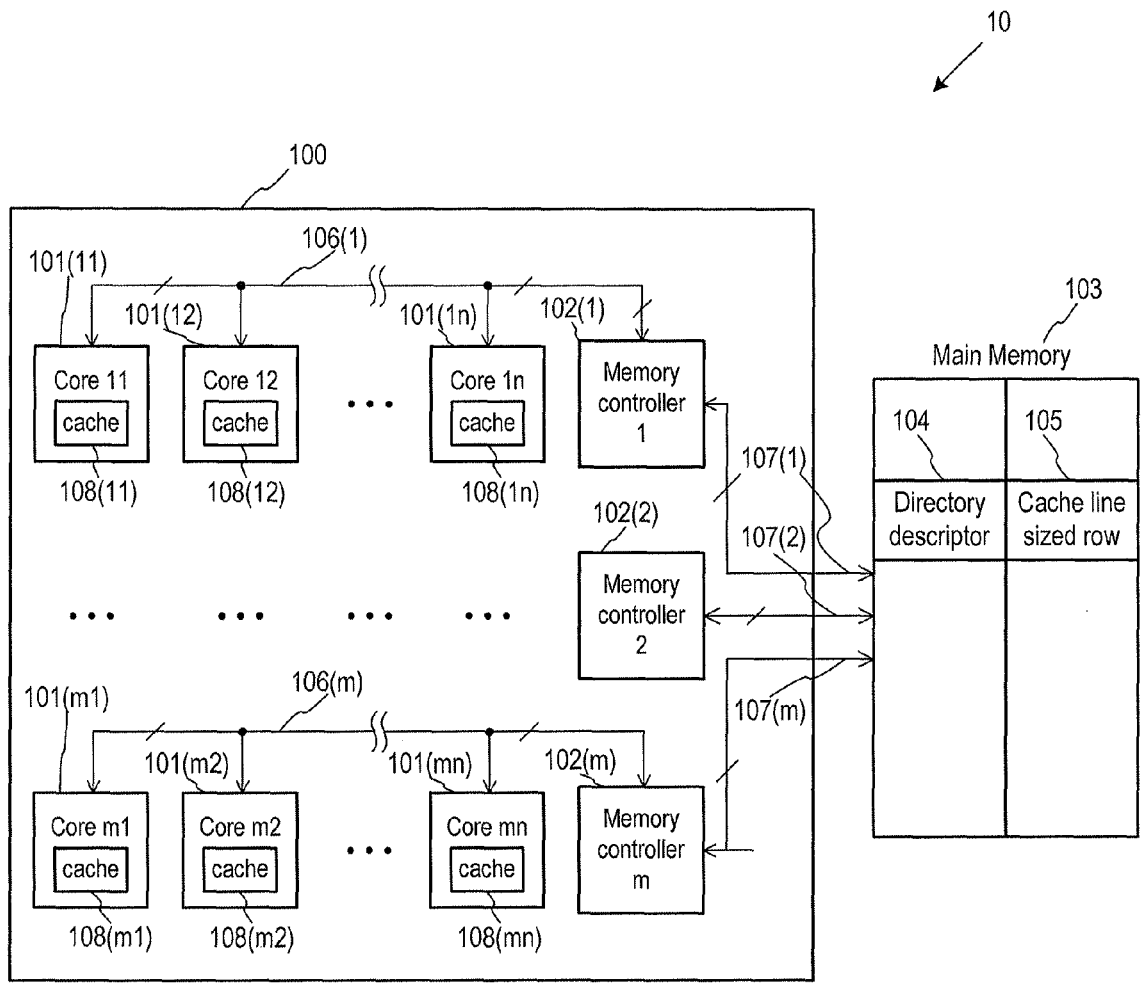
FIG. 1 is a block diagram of an example of a multi-core processor system in which examples of directory based coherence caching may be used.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly and implicitly contemplated and make part of this disclosure.

Described herein, inter alia, are examples of methods, apparatus, computer programs and systems related to multi-core parallel processing directory-based cache coherence.

FIG. 1 is a block diagram of an example of a multi-core processor system 10 in which examples of directory based coherence caching may be used. With reference to FIG. 1, the multi-core processor system 10 may include a multi-core processor 100 containing a plurality of processor cores 101 (11-mn), each of which can access a main memory 103 through one or more memory controllers 102(1-m). As shown in FIG. 1, each memory controller 102(1-m) may provide access to the main memory 103 through a bus 107(1-m) for a respective set of the plurality of processor cores 101(11-mn), although other arrangement may be used in other examples. Each set of the plurality of processor cores 101(11-mn) is coupled to a respective one of the memory controllers 102(1-m) through a respective bus 106(1-m). The memory controllers 102(1-m) may transmit memory requests to the main memory 103 through the bus 107(1-m), each of which may include a memory command and a memory address. The memory command may correspond to either a write request or a read request. For a memory command that corresponds to a write request, the request may also include write data so that the main memory 103 may store the write data in the specified memory address in response to the write request from the requesting one of the memory controllers 102(1-m). For a memory command that corresponds to a read request, the requesting one of the memory controllers 102(1-m) may also receive read data from the main memory 103 in response to transmitted read requests. The memory requests may originate with one of the plurality of processor cores 101 (1-mn) in the multi-core processor 100 or with some other device, such as a direct memory access device (not shown). The memory requests may require many clock cycles for completion. Caches 108(11-mn) internal to each of the plurality of processor cores 101(11-mn), which are commonly known as Level 1 ("L1") caches, may be employed to hide this latency.

When one of the plurality of processor cores 101(11-mn) initiating a read request determines that read data are not present in the corresponding cache 108(11-mn), the one of the plurality of processor cores 101(11-mn) may request the data from the main memory 103. In directory-based cache coherence schemes, a directory descriptor 104 for the associated set of memory location, such as a cache-line-sized row 105, in the main memory 103 may be updated with information Indicating the particular one of the plurality of processor cores 101(11-mn) that initiated the read request now has a copy of this data. The cache-line sized row 105 in the main memory 103 comprises the data bits that may be stored in each row of the cache memory 108(11-mn) in each of the plurality of the processor cores 101(11-mn). A separate directory descriptor 104 may be provided for each cache-line-sized row 105 in the main memory 103. Each directory descriptor 104 may contain a record of all of the plurality of processor cores 101(11-mn) having a cache 108(11-mn) that contains the data stored in the respective cache-line-sized row 105.

When one of the plurality of processor cores 101(11-mn) in a set, such as core i, asserts a write request to cause the respective one of the plurality of memory controllers 102(1-m) for the set to write data in the main memory 103, the processor core i may cause the memory controller 102(1-m) to inform the main memory 103 to update the status of the line of the directory descriptor 104 in the main memory 103 too. For example, the status of the line of the directory descriptor may be changed to "dirty" or "exclusive" depending on the specific example of the directory-based cache coherence scheme. The status of the line of the directory descriptor 104 may be changed by the directory descriptor 104 for the associated cache-line-sized row 105 to which the data are written providing an indication to all of the plurality of processor cores 101(11-mn) having a cache that contains the data that has been overwritten. The processor core i 101(11-mn) may then cause the respective one of the memory controllers 102(1-m) to cause an indication to be stored in the main memory 103 that marks the cached data for the associated cache-line-sized row 105 as invalid so that a cache miss will occur if the processor core i 101(11-mn) subsequently asserts a read request to cause the respective one of the plurality of memory controllers 102(1-m) for the set to attempts to read the data stored in the cache-line-sized row 105. A cache miss may cause the processor core i 101(11-mn) to asserts a read request to cause the respective one of the plurality of memory controllers 102(1-in) for the set to read the data from the main memory 103 and may also cause the read data to be stored in the cache 108(11-mn) for that processor core i 101(11-mn).

If another one of the plurality of processor cores 101(11-mn), e.g., core j, asserts a request to cause the respective one of the plurality of memory controllers 1041-m) for the set to access a line after the processor core i has asserted a write request to cause the respective one of the plurality of memory controllers 102(1-m) for the set to write data in the main memory 103, the processor core j may assert a request for the respective one of the memory controllers 102(1-m) to ask the main memory 103 for the status of this line, which may then be retrieved from the main memory 103 using the directory descriptor 104. When many of the plurality of the plurality of processor cores 101(11-mn) are present in the multi-core processor 100, the number of directory accesses may become quite high. The multi-core processor system 10 shown in FIG. 1 may be faced with a large number of accesses and may have difficulty providing the same level of performance that is possible when far few accesses are present.

Figure 2:
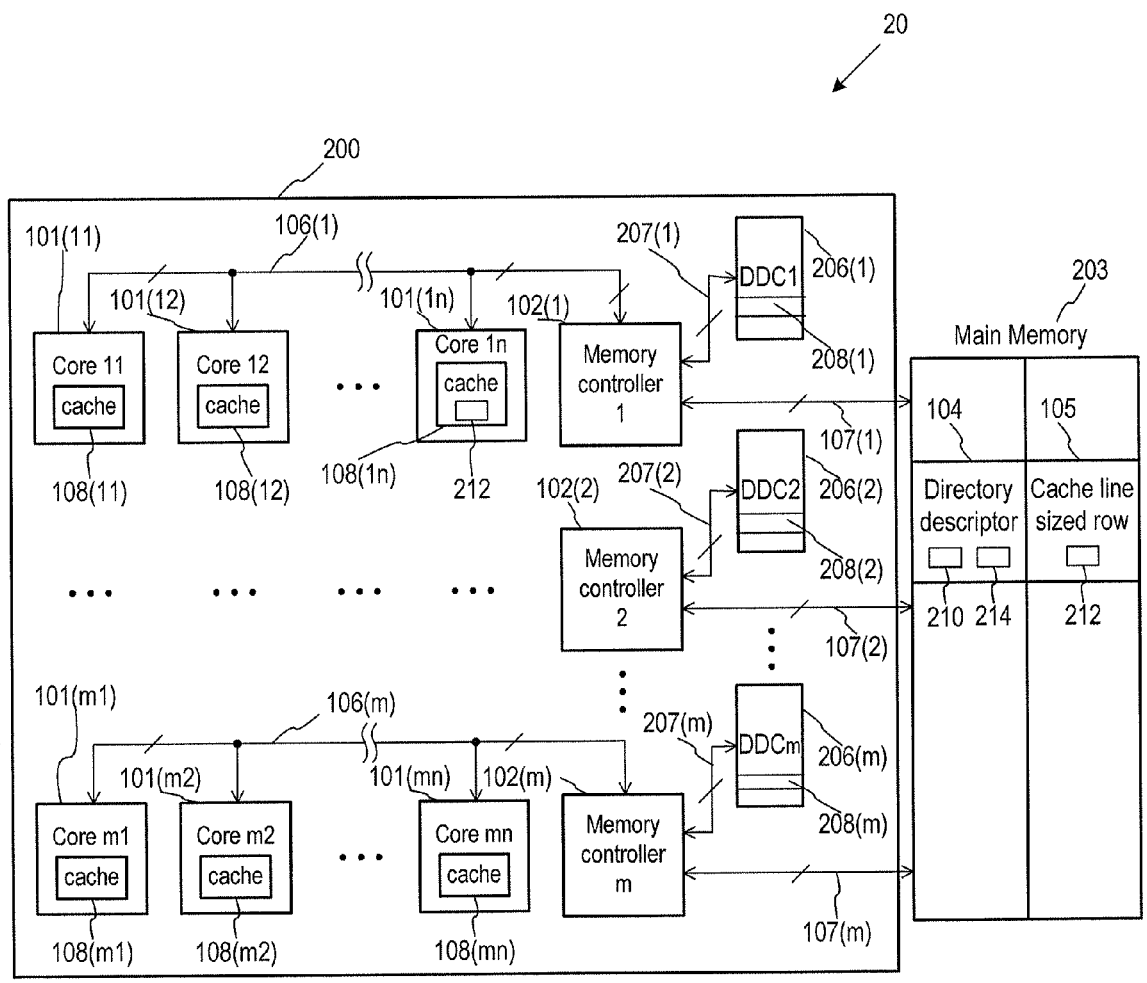
FIG. 2 is a block diagram of an example of an augmented multi-core processor system that may use examples of directory based coherence caching.

FIG. 2 is a block diagram of an example of an augmented multi-core processor system 20 that may use examples of directory based coherence caching arranged in accordance with at least some embodiments of the present disclosure. The multi-core processor system 20 may be adapted to reduce the number of accesses to the directory descriptor 104 even though the multi-core processor system 20 contains a multi-core processor 200 having a large number of processor cores 101(11-mn). The multi-core processor system 20 may therefore be configured to provide the same level of performance that is present in a conventional system despite the large number of accesses by using a respective directory descriptor cache 206(1-m) ("DDC") for each of the plurality of memory controllers 102(1-m) and coupled to the respective memory controller 102(1-m) through a respective bus 207(1-m). The directory descriptor caches 206(1-m) may be arranged to store a cached copy 208(1-m) of the directory descriptors 104 in main memory 203, and the processor cores 101(11-mn) may be adapted to determine the status of each of a plurality of sets of memory locations, such as cache-line-sized rows 105, of the main memory 203 without actually accessing the main memory 203.

When one of the plurality of processor cores 101(11-nm) first asserts a write request to cause the respective one of the plurality of memory controllers 102(1-m) for the set e.g., memory controller 1, to access a cache-line-sized row 105 in the main memory 203, the corresponding directory descriptor cache 206(1-m), i.e., DDC 1, should be updated to show that DDC 1 has the copy 208(1-m) of the directory descriptor 104 for that cache-line-sized row 105. This directory descriptor 104 may provide an indication 210 that the cache 108(11-mn) for the processor core accessing the cache-line-sized row 105 in the main memory 203 has the copy of the accessed data 212. The directory descriptor 104 may also provide a record 214 of the processor cores 101(11-mn) having a cache 108 (11-mn) that contains the copy of the accessed data 212. However, the other directory descriptor caches 206(1-m) should also be updated to show that DDC 1 has the copy 208(1-m) of the directory descriptor 104 for the accessed data 212 from the cache-line-sized row 105. Similarly, if another of the plurality of processor cores 101(11-mn) accesses the cache-line-sized row 105 through a different one of the plurality of memory controllers 102(1-m), e.g., memory controller 2, the directory descriptor 104 for that cache-line-sized row 105 stored in DDC 1 should be updated using one of several different techniques in different examples.

In one example, when one of the DDCs 206(1-m) is updated, the updated one of the DDCs 206(1-m) provides the update information to the other of the DDCs 206(1-in). For example, if one of the processor cores 101(11-nm), e.g., processor core 2, initiates a write or read of data to/from main memory 203 through memory controller 1, the copy 208(1-m) of the directory descriptor 104 stored in DDC 1 206(1-m) may be updated to provide an indication that the cache 108 (11-mn) for the processor core 2 101(11-mn) has a copy of the data 212 stored in the associated cache-line-sized row 105 in the main memory 203. The DDC 1 may then transmit the copy 208(1-m) of the updated directory descriptor 104 from DDC1 to DDC2 and/or DDCk. DDC 2 and/or DDCk may then update the copy 208(1-m) of the directory descriptor 104 stored therein to mark the cache-line-sized row of data stored in the cache 108(11-mn) of processor core 101(11-mn), other than the processor core 2 101(11-mn) as invalid, since that data may have been changed in the main memory 103 and are thus stale.

Figure 3:
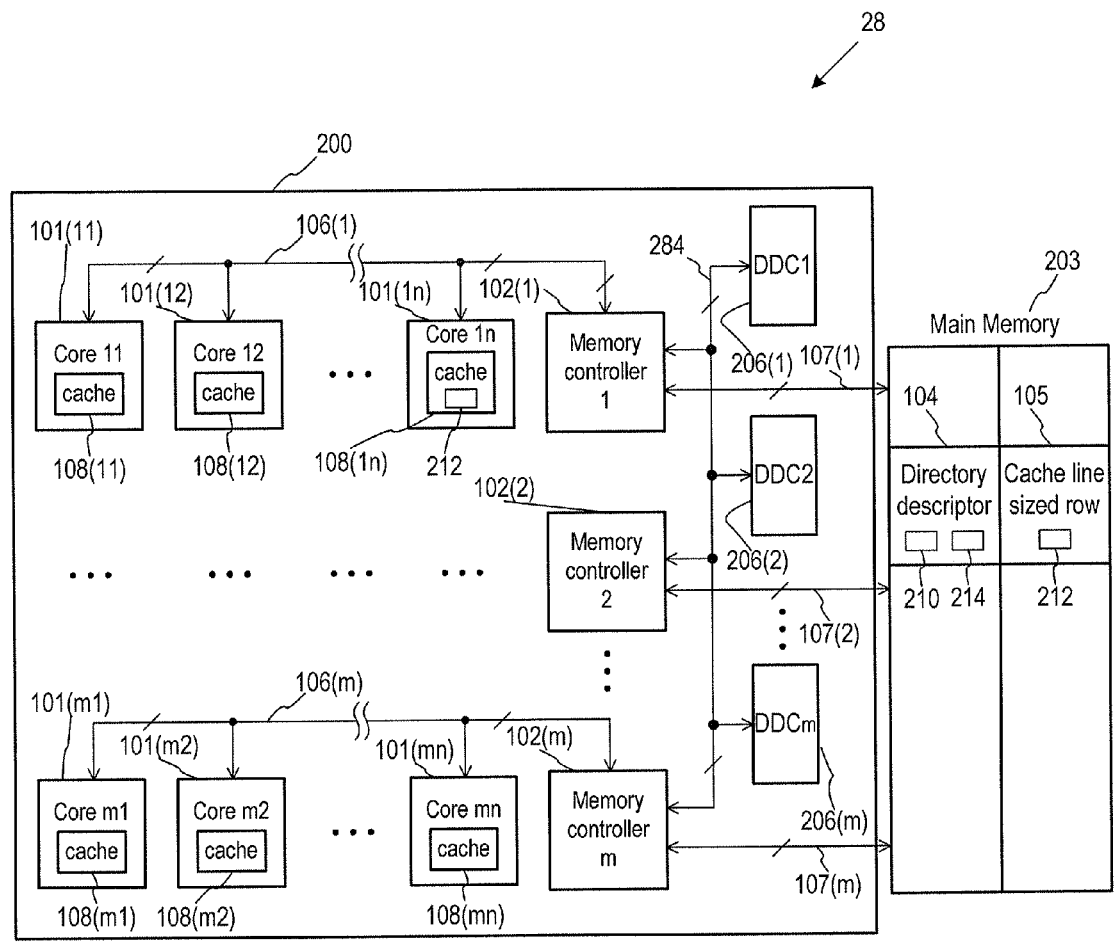
FIG. 3 is a block diagram of another example of an augmented multi-core processor system that may use examples of directory based coherence caching.

FIG. 3 is a block diagram of another example of an augmented multi-core processor system 28 that may use examples of directory based coherence caching arranged in accordance with at least some embodiments of the present disclosure. The multi-core processor system 28 may use many of the same components that are illustrated in the multi-core processor system 20 of FIG. 2, and they may operate in a substantially similar manner. Therefore, in the interests of brevity and clarity, an explanation of the function and operation of these common components will not be repeated. In the multi-core processor system 28, all of the DDCs 206(1-m) in multi-core processor 200 are coupled to a common bus 284, and each of the DDCs 206(1-m) is configured to "snoop" that bus to detect an updating of a directory descriptor 104 stored in any of the other DDCs 206(1-m). When an update of a copy 208(1-m) of a directory descriptor 104 in one DDC 206(1-m) is detected during "snooping", the other DDCs with the same copy 208(1-m) of the directory descriptor 104 can update their respective copies 208(1-m) of the directory descriptor 104.

In still another example, when one of the DDCs 206(1-m) updates a directory descriptor 104 contained within it, the update may be sent to the main memory 203. The main memory 203 may then either update other DDCs 206(1-m) that have copies of the directory entry 104, or inform those DDCs that their directory descriptors 104 are stale and should be invalidated.

In any of these and other examples, the directory descriptor cache 206(1-m) as described herein may be configured to allow the multi-core processor 200 including many processor cores 101(11-mn) to efficiently implement a directory-based cache coherence scheme without the undue latency to access directory descriptor 104 in the main memory 203.

Figure 4:
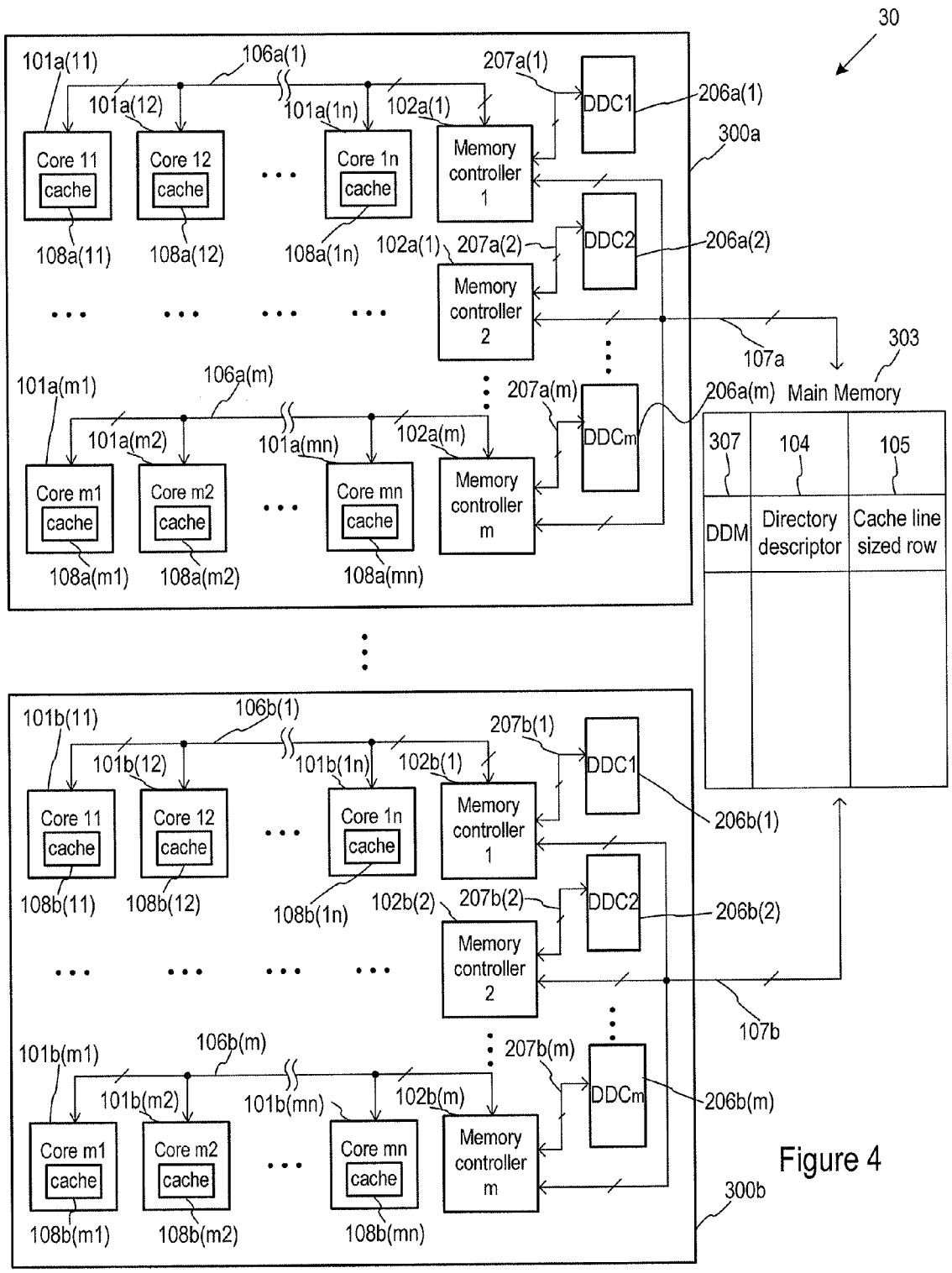
FIG. 4 is a block diagram of another example of an augmented multi-core, multi-processor system that may use examples of directory based coherence caching.

FIG. 4 is a block diagram of another example of a multi-core processor system 30 that may use examples of directory based coherence caching, arranged in accordance with at least some embodiments of the present disclosure. The multi-core processor system 30 may use many of the same components that are illustrated in the multi-core processor system 20 of FIG. 2, and they may operate in a substantially similar manner. Therefore, in the interests of brevity and clarity, an explanation of the function and operation of these common components will not be repeated. The multi-core processor system 30 differs from the multi-core processor system 20 by using a plurality of multi-core processors 300a and 300b, and by augmenting the main memory 303 with a directory descriptor metadescriptor ("DDM"-) 307 that may be arranged to store the status of each entry in each of the directory descriptor caches 206a (1-m) and 206b (1-mn) in each of the plurality of multi-core processors 300a and 300b. The directory descriptor metadescriptor 307 may be used to provide update information to the DDCs 206a (1-m) and 206b (1-mn) in each of the plurality of multi-core processors 300a and 300b when one or more of the DDCs 206a(1-m) and 206b (1-mn) in another of the plurality of multi-core processors 300a and 300b is updated as explained above with reference to FIG. 2. In the event that the DDCs 206a (1-m) and 206b (1-mn) in one of the plurality of multi-core processors 300a and 300b is updated, one of the updated DDCs 206a (1-mn) and 206b (1-mn) may be arranged to provide the updated directory descriptor 104 to the main memory 303 for storage in the directory descriptor metadescriptor 307. The main memory 303 may then provide the updated directory descriptor 104 to all of the other of the plurality of multi-core processors 300a and 300b for storage in the DDCs 206a (1-m) and 206b (1-mn) of that multi-core processor 300a and 300b.

Although the directory descriptor metadescriptor 307 is shown in FIG. 4 in a multi-core processor system 30 having a plurality of multi-core processors, in other examples the directory descriptor metadescriptor 307 may be used in a multi-core processor system having a single multi-core processor. In such an example, the directory descriptor metadescriptor 307 may be used in a manner similar to the manner in which the directory descriptor metadescriptor 307 is used in the example of FIG. 4.

Figure 5:
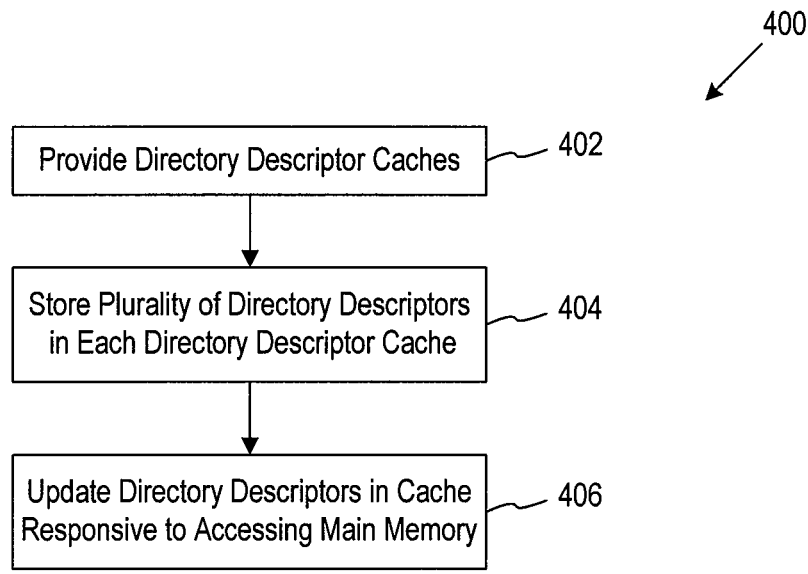
FIG. 5 is a flow chart showing a method for directory-based cache coherence in a multi-core processor system.

FIG. 5 is a flow chart showing a method 400 for directory-based cache coherence in a multi-core processor system that is arranged in accordance with at least some embodiments of the present disclosure. The method 400 may include various operations, functions or actions as illustrated by one or more of blocks 402, 404, and/or 406. Although illustrated as separate blocks, one or more of the blocks in method 400 may be combined together, separated into additional blocks, or eliminated as may be required for a particular implementation.

Processing for method 400 may begin at block 402 (Provide Directory Descriptor Caches). Block 402 may be followed by block 404 (Store Plurality of Directory Descriptors in Each Directory Descriptor Cache). Block 406 may be followed by block 406 (Update Directory Descriptors in Cache Responsive to Accessing Main Memory).

At block 402, one or more directory descriptor caches 206(1-m) or 206a (1-m) and 206b (1-m) may be provided in the multi-core processor 200 or 300a and 300b, respectively. As explained above, each directory descriptor cache 206(1-m) or 20641-m) and 206b (1-m) may be associated with at least a subset of processor cores (e.g., one or more of the processor cores) in the multi-core processor 200 or 300a and 300b, respectively. At block 404, a plurality of directory descriptors 104 may be stored in each directory descriptor cache 206(1-m) or 206a (1-m) and 206b (1-m). As also explained above, each of the directory descriptors 104 may provide an indication of cache sharing status of a respective set of memory locations, such as a cache-line-sized row 105, of the main memory 103. At block 406 the directory descriptors 104 stored in each directory descriptor cache 206(1-m) or 206a (1-m) and 206b (1-m) may be updated responsive to one of the processor cores 101(11-mn) or 101a (11-mn) and 101b (11-mn) in the subset accessing the respective set of memory locations, such as a cache-line-sized row 105, of main memory 103.

Figure 6:
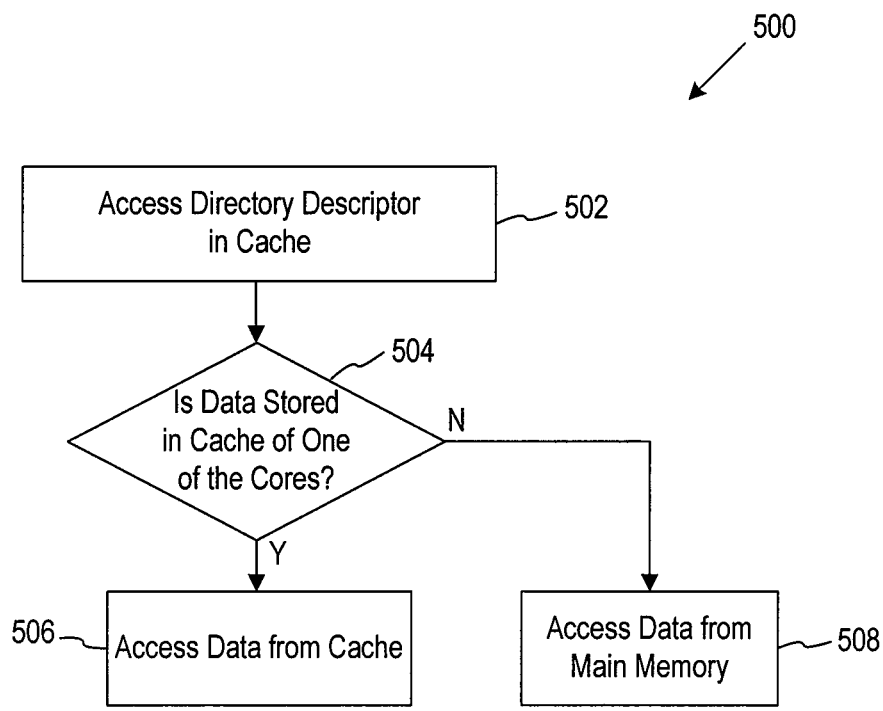
FIG. 6 is a flow chart showing a method of accessing main memory from a multi-core processor.

FIG. 6 is a flow chart showing a method 500 of accessing the main memory 103 from the multi-core processor 200 or 300a and 300b respectively, arranged in accordance with at least some embodiments of the present disclosure. The method 500 may include various operations, functions or actions as illustrated by one or more of blocks 502, 504, 506 and/or 508. Although illustrated as separate blocks, one or more of the blocks in method 500 may be combined together, separated into additional blocks, or eliminated as may be required for a particular implementation.

Processing for method 500 may begin at block 502 (Access Directory Descriptor in Cache). Block 502 may be followed by block 504 (Is Data Stored in Cache of One of the Cores). Block 506 may be followed by block 506 (Access Data from Cache) when method 500 determines, at block 504, that data is stored in a cache for one of the cores. Otherwise, block 506 may be followed by block 508 (Access Data from Main Memory) when method 500 determines, at block 504, that data is not stored in the cache for one of the cores.

At block 502, a directory descriptor 104 in a directory descriptor cache 206(1-m) or 206a (1-m) and 206b (1-m) in the processor 200 or 300a and 300b, respectively, may be accessed by one of the processor cores 101(11-nm) or 101a (11-mn) and 101b (11-mn) in the multi-core processor. This should be accomplished before the processor core 101(11- mn) or 101*a* (11-mn) and 101*b* (11-mn) attempts to accesses data stored in a set of memory locations, such as cache-line-sized row 105, of the main memory 103. At block 504 the accessed directory descriptor 104 may be used by the core 101(11-mn) or 101*a* (11-mn) and 101*b* (11-mn) to determine if the data stored in the set of memory locations, such as cache-line-sized row 105, of the main memory 103 are stored in the cache of one of the processor cores 101(11-mn) or 101*a* (11-mn) and 101*b* (11-mn) of the multi-core processor 200 or 300*a* and 300*b*, respectively. If the determination is made at block 504 that the data stored in the set of memory locations, such as the cache-line-sized row 105, of the main memory 103 are stored in the cache of one of the processor cores 101(11-mn) or 101*a* (11-mn) and 101*b* (11-mn), then at block 506 the data stored in the set of memory locations, such as the cache-line-sized row 105, of the main memory 104 may be accessed from the cache of the processor cores 101(11-mn) or 101*a* (11-mn) and 101*b* (11-mn) of the multi-core processor 200 or 300*a* and 300*b*, respectively. Otherwise, the set of memory locations, such as the cache-line-sized row 105, corresponding to the accessed directory descriptor 104 may be accessed in the main memory 103 at block 508.

FIG. 7 shows an example of a computer readable medium 600 that stores instructions that may be part of a computer program product 602 to configure the multi-core processor 200 or 300*a* and 300*b*, arranged in accordance with at least some embodiments of the present disclosure. The computer readable medium 600 may be arranged to store instructions 604, which when executed may configure the multi-core processor 200 or 300*a* and 300*b* to perform all or some of the processes, methods and/or techniques described herein. These instructions may include, for example, an executable instruction 606 for configuring the computer multi-core processor 200 or 300*a* and 300*b* to store a plurality of directory descriptors in the directory descriptor cache. As explained above, each of the directory descriptors may provide an indication of the cache sharing status of a respective set of memory locations, such as a cache-line-sized row, of main memory. The executable instructions stored in the computer readable medium 600 may also include an executable instruction 608 to configure the multi-core processor 200 or 300*a* and 300*b* to access the directory descriptor cache to determine from the corresponding directory descriptor stored in the directory descriptor cache if the data stored in the respective set of memory locations, such as a cache-line-sized row, of main memory is stored in the cache of one of the cores. This instruction may be executed prior to one of the cores accessing a set of memory locations, such as a cache-line-sized row, in main memory. Finally, the executable instructions stored in the computer readable medium 600 may include an executable instruction 610 to configure the multi-core processor 200 or 300*a* and 300*b* to update the directory descriptors stored in the directory descriptor cache responsive to one of the cores accessing the set of memory locations, such as a cache-line-sized row, of main memory.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

I claim:

1. A method for directory-based cache coherence in a multi-core processor system that includes a main memory, a plurality of processor cores, and a plurality of caches each associated with a respective one of the plurality of processor cores, the method comprising:

providing a directory descriptor cache in the multi-core processor system, wherein the directory descriptor cache is separate from the plurality of caches, the directory descriptor cache being associated with a subset of the plurality of processor cores;

storing a directory descriptor in the directory descriptor cache, the directory descriptor including information identifying each of the plurality of caches associated with the respective ones of the subset of the plurality of processor cores that includes data stored at a respective set of memory locations of the main memory;

updating the directory descriptor stored in the directory descriptor cache in response to a processor core of the subset of the plurality of processor cores accessing at least one location of the respective set of memory locations of the main memory; and maintaining a directory descriptor metadescriptor in the main memory, the directory descriptor metadescriptor containing a copy of the directory descriptor stored in the directory descriptor cache.

2. The method of claim 1, wherein the updating the directory descriptor stored in the directory descriptor cache comprises storing, at the directory descriptor cache, the directory descriptor including an indication that corresponding data stored in caches of the plurality of caches corresponding to respective others of the plurality of processor cores is invalid in response to one of the plurality of processor cores writing data to at least one location of a set of memory locations in the main memory.

3. A method for directory-based cache coherence in a multi-core processor system that includes a main memory, first and second pluralities of processor cores, and a first plurality of caches associated with the first plurality of processor cores and a second plurality of caches associated with the second plurality of processor cores, the method comprising:

providing a first directory descriptor cache in the multi-core processor system, the first directory descriptor cache being associated with the first plurality of processor cores;

providing a second directory descriptor cache in the multi-core processor system, the second directory descriptor cache being associated with the second plurality of processor cores;

storing a first directory descriptor in the first directory descriptor cache and storing a second directory descriptor in the second directory descriptor cache, the stored first and second directory descriptors being configured to provide an indication of cache sharing, status of memory locations of the main memory;

updating the first directory descriptor stored in the first directory descriptor cache in response to one of the first plurality of processor cores accessing at least one of the memory locations of the main memory;

maintaining a directory descriptor metadescriptor in the main memory, the directory descriptor metadescriptor containing a copy of the first directory descriptor stored in the first directory descriptor cache and a copy of the second directory descriptor stored in the second directory descriptor cache; and using the directory descriptor metadescriptor to update the second directory descriptor in the second directory descriptor cache responsive to one of the second plurality of processor cores accessing at least one of memory locations of the main memory.

4. The method of claim 1. further comprising reading data stored in one of the sets of memory locations of the main memory using a processor core of the plurality of processor cores by:

accessing, in the directory descriptor cache, the directory descriptor corresponding to the one of the sets of memory locations of the main memory;

determining, based on the accessed directory descriptor, whether the data stored in the one of the sets of memory locations of the main memory are stored in the cache of the plurality of caches associated with the processor core of the plurality of processor cores;

reading the data stored in the one of the sets of memory locations of the main memory from the cache associated with the processor core of the plurality of processor cores when the data stored in the one of the sets of memory locations of the main memory are determined to he stored in the cache associated with the processor core of the plurality of processor cores; and reading the data stored in the one of the sets of memory locations of the main memory from the main memory when the data stored in the one of the sets of memory locations of the main memory are determined to not be stored in the cache associated with the processor core of the plurality of processor cores.

5. The method of claim 1, wherein the multi-core processor system comprises a plurality of directory descriptor caches each of which is associated with a respective subset of the plurality of processor cores, and wherein the method further comprises updating others of the plurality of directory descriptor caches in response to the updating of the directory descriptor stored in one of the plurality of directory descriptor caches.

6. The method of claim 5, wherein updating the others of the plurality of directory descriptor caches comprises:

monitoring a signal bus, wherein the signal bus is associated with communications with the plurality of directory descriptor caches that are each associated with the respective subset of the plurality of processor cores;

detecting update information on the signal bus, wherein the update information is associated with an update to the directory descriptor stored in one of the plurality of directory descriptor caches; and updating the others of the directory descriptor caches based on the detected update information.

7. The method of claim 5, wherein updating of the directory descriptor stored in the one of the plurality of directory descriptor caches comprises:

transmitting update information from the one of the plurality of directory descriptor caches to another of the plurality of directory descriptor caches after the updating of the directory descriptor stored in the one of the plurality of directory descriptor caches; and updating, the another of the plurality of directory descriptor caches with the transmitted update information.

8. The method of claim 5, wherein updating of the directory descriptor stored in the one of the plurality of directory descriptor caches comprises:

transmitting update information from the one of plurality of directory descriptor caches to the main memory after the updating of the directory descriptor stored in the one of the plurality of directory descriptor caches;

storing the transmitted update information from the one of the plurality of directory descriptor caches in the main memory;

transmitting, the update information from the main memory to another of the plurality of directory descriptor caches; and updating the another of the plurality of directory descriptor caches with the transmitted update information from the main memory.

9. A method to access main memory from a multi-core processor that includes a plurality of processor cores each of which includes a respective cache, the method comprising:

before one of the plurality of processor cores in the multi-core processor accesses data stored in a set of memory locations of main memory, accessing a directory descriptor in a directory descriptor cache in the multi-core processor, the directory descriptor cache being separate from the respective caches of the plurality of processor cores, the directory descriptor including information that identifies each of the plurality of processor cores that includes a respective cache containing the data stored in the set of memory locations of the main memory;

determining, based on the accessed directory descriptor, whether the data stored in the set of memory locations of the main memory are stored in the respective cache of a processor core of the plurality of processor cores;

in response to determining that the data stored in the set of memory locations of the main memory are stored in the respective cache of the processor core of the plurality of processor cores, accessing the data stored in the set of memory locations of main memory from the respective cache of the processor core of the plurality of processor cores;

in response to determining that the data stored in the set of memory locations of the main memory is not stored in the respective cache of the processor core of the plurality of processor cores, accessing the set of memory locations of the main memory from a location corresponding to the accessed directory descriptor; and maintaining a directory descriptor metadescriptor in the main memory, the directory descriptor metadescriptor containing a copy of the directory descriptor in the directory descriptor cache.

10. The method of claim 9, further comprising:
writing data to a set of memory locations of the main memory using. a first processor core of the plurality of processor cores;
storing the data written to the set of memory locations of the main memory in the respective cache of the first processor core; and
updating, in the directory descriptor cache, the directory descriptor corresponding to the set of memory locations of the main memory to indicate that the data written to the set of memory locations of the main memory is stored in the respective cache of the first processor core.

11. The method of claim 10, wherein the multi-core processor includes a plurality of directory descriptor caches, and wherein the method further comprises, when updating the directory descriptor stored in one of the plurality of directory descriptor caches, updating corresponding directory descriptors stored in others of the plurality of directory descriptor caches to indicate that data written to a cache-line-sized row corresponding to the directory descriptors is invalid.

12. A system, comprising:
a multi-core processor that includes a plurality of processor cores;
a main memory coupled to the multi-core processor, wherein the main memory is configured to store a directory descriptor metadescriptor;
a plurality of caches each operatively coupled to a respective one of the plurality of processor cores; and
a directory descriptor cache associated with the plurality of the processor cores, wherein the directory descriptor cache is separate from the plurality of caches, the directory descriptor cache being configured to store a directory descriptor, the directory descriptor including information that identifies each of the plurality of caches that is operatively coupled to the respective one of the plurality of processor cores that contain data stored at a respective set of memory locations of the main memory, wherein the directory descriptor metadescriptor stored in the main memory includes a copy of the directory descriptor stored in the directory descriptor cache.

13. The system of claim 12, wherein the directory descriptor cache is configured to update the directory descriptor stored in the directory descriptor cache responsive to access, by one of the plurality of processor cores, of the respective set of memory locations of the main memory.

14. The system of claim 13, further comprising a plurality of directory descriptor caches including the directory descriptor cache, each of the plurality of directory descriptor caches associated with a respective subset of the plurality of the processor cores, each of the plurality of directory descriptor caches being configured to share update informtion provided to one of the plurality of directory descriptor caches with others of the plurality of directory descriptor caches responsive to an update of the directory descriptor stored in the one of the plurality of directory descriptor caches.

15. The system of claim 14, further comprising a signal bus coupled to each of the plurality of directory descriptor caches, and wherein the plurality of directory descriptor caches are configured to snoop the signal bus to detect the update of the directory descriptor in the one of the plurality of directory descriptor caches and to update a corresponding directory descriptor in each of the others of the plurality of directory descriptor caches.

16. A system comprising:
a first multi-core processor that includes a first plurality of processor cores;
a second multi-core processor that includes a second plurality of processor cores;
a main memory coupled to the first and second multi-core processors;
a first plurality of caches operatively coupled to the first plurality of processor cores;
a second plurality of caches operatively coupled to the second plurality of processor cores;
a first directory descriptor cache associated with the first plurality of the processor cores, the first directory descriptor cache being configured to store a first directory descriptor configured to provide an indication of cache sharing, status of memory locations of the main memory;
a second directory descriptor cache associated with the second plurality of the processor cores, the second directory descriptor cache being configured to store a second directory descriptor configured to provide an indication of cache sharing status of memory locations of the main memory; and
a directory descriptor metadescriptor stored in the main memory, the directory descriptor metadescriptor including, a copy of the first directory descriptor stored in the first directory descriptor cache and the second directory descriptor stored in the second directory descriptor cache.

17. The system of claim 16, wherein the directory descriptor metadescriptor is configured to be responsive to access by one of the first plurality of processor cores of the first multi-core processor of data stored in a respective cache-line-sized row of the main memory, to update the second directory descriptor corresponding to the cache-line-sized row of the main memory in the second directory descriptor cache of the second multi-core processor.

18. The system of claim 16, wherein the directory descriptor metadescriptor is configured to he responsive to access by one of the first plurality of processor cores of the first multi-core processor of data stored in a respective cache-line-sized row of the main memory, to transmit update information from the first directory descriptor cache of the first multi-core processor to the main memory for storage therein, the directory descriptor metadescriptor being configured to transmit the update information from the main memory to the second directory descriptor cache of the second multi-core processor.

19. A non-transitory computer readable medium that includes computer executable instructions stored thereon and to be executed by a multi-core processor to access data stored in main memory, wherein the multi-core processor includes a directory descriptor cache and a plurality of processor cores each of which includes a respective cache, the computer executable instructions being configured to enable the multi-core processor to:

- store a plurality of directory descriptors in the directory descriptor cache, the directory descriptor cache separate from the respective caches of the plurality of processor cores, each of the plurality of directory descriptors including respective information that identifies each of the respective caches of the plurality of processor cores that includes data stored at a respective set of memory locations of the main memory;
- prior to access, by one of the plurality of processor cores of a set of memory locations in main memory, access the directory descriptor cache to determine from a corresponding directory descriptor stored in the directory descriptor cache if the data stored in the respective set of memory locations of the main memory is stored in the respective cache of the one of the plurality of processor cores;
- update the directory descriptors stored in the directory descriptor cache responsive to access by the one of the plurality of processor cores of the set of memory locations of the main memory; and
- maintain a directory descriptor metadescriptor in the main memory, the directory descriptor metadescriptor including a copy of the director descriptors stored in the directory descriptor cache.

20. The non-transitory computer readable medium of claim 19, wherein the computer executable instructions are configured to enable the multi-core processor to update the corresponding directory descriptor stored in the directory descriptor cache by storage of, in the directory descriptor cache, the corresponding directory descriptor including an indication corresponding to the set of memory locations of the main memory that corresponding data stored in the cache of each of others of the plurality of processor cores is invalid in response to a write by one of the plurality of processor cores of data to the set of memory locations in the main memory.

21. The non-transitory computer readable medium of claim 19, wherein the computer executable instructions further comprise instructions configured to enable the multi-core processor to read data stored in one of the sets of memory locations of the main memory using one of the plurality of processor cores, by:

- access, in the directory descriptor cache, the corresponding directory descriptor corresponding to the one of the sets of memory locations of the main memory;
- determine, with the accessed directory descriptor, if the data stored in the one of the sets of memory locations of main memory are stored in the cache of a processor core of the plurality of processor cores;
- read the data stored in the one of the sets of memory locations of the main memory from the cache of the processor core of the plurality of processor cores, in response to the data stored in the one of the sets of memory locations of the main memory being determined to he stored in the cache of the processor core of the plurality of processor cores; and
- read the data stored in the one of the sets of memory locations of the main memory from the main memory, in response to the data stored in the one of the sets of memory locations of the main memory being determined to not he stored in the cache of the processor core of the plurality of processor cores.

* * * * *

UNITED STATES PATENT AND TRADEMARK OFFICE
CERTIFICATE OF CORRECTION

PATENT NO. : 8,874,855 B2
APPLICATION NO. : 12/648092
DATED : October 28, 2014
INVENTOR(S) : Conte It is certified that error appears in the above-identified patent and that said Letters Patent is hereby corrected as shown below:

In the Specification,

In Column 2, Line 61, delete "101(1-mn)" and insert -- 101(11-mn) --, therefor.

In Column 3, Lines 9-21, delete "Indicating.................105." and insert the same at Line 8, after "information", as a continuation paragraph.

In Column 3, Line 9, delete "Indicating" and insert -- indicating --, therefor.

In Column 3, Line 48, delete "102(1-in)" and insert -- 102(1-m) --, therefor.

In Column 3, Line 53, delete "1041-m)" and insert -- 102(1-m) --, therefor.

In Column 4, Line 23, delete "101(11-nm)" and insert -- 101(11-mn) --, therefor.

In Column 4, Line 49, delete "206(1-in)." and insert -- 206(1-m). --, therefor.

In Column 4, Line 50, delete "101(11-nm)," and insert -- 101(11-mn), --, therefor.

In Column 4, Line 59, delete "DDCk. DDC 2 and/or DDCk" and insert -- DDCm. DDC 2 and/or DDCm --, therefor.

In Column 5, Line 23, delete "entry" and insert -- descriptor --, therefor.

In Column 5, Line 57, delete "206a (1-mn)" and insert -- 206a(1-m) --, therefor.

In Column 6, Line 27, delete "20641-m)" and insert -- 206a(1-m) --, therefor.

In Column 6, Line 45, delete "300b" and insert -- 300b, --, therefor.

Signed and Sealed this
Seventh Day of April, 2015

Michelle K. Lee
*Director of the United States Patent and Trademark Office*

In Column 6, Line 65, delete "101(11-nm)" and insert -- 101(11-mn) --, therefor.

In Column 7, Line 16, delete "main memory 104" and insert -- main memory 103 --, therefor.

In the Claims

In Column 11, Line 41, in Claim 3, delete "sharing," and insert -- sharing --, therefor.

In Column 11, Line 58, in Claim 4, delete "claim 1." and insert -- claim 1, --, therefor.

In Column 12, Line 8, in Claim 4, delete "to he" and insert -- to be --, therefor.

In Column 12, Line 44, in Claim 7, delete "updating," and insert -- updating --, therefor.

In Column 12, Line 56, in Claim 8, delete "transmitting," and insert -- transmitting --, therefor.

In Column 13, Line 32, in Claim 10, delete "using." and insert -- using --, therefor.

In Column 14, Line 13, in Claim 14, delete "informtion" and insert -- information --, therefor.

In Column 14, Line 41, in Claim 16, delete "sharing," and insert -- sharing --, therefor.

In Column 14, Lines 50-51, in Claim 16, delete "including," and insert -- including --, therefor.

In Column 14, Line 64, in Claim 18, delete "to he" and insert -- to be --, therefor.

In Column 15, Line 37, in Claim 19, delete "director" and insert -- directory --, therefor.

In Column 16, Line 29, in Claim 21, delete "to he" and insert -- to be --, therefor.

In Column 16, Line 36, in Claim 21, delete "to not he" and insert -- to not be --, therefor.